(12) United States Patent
Kaplan

(10) Patent No.: US 6,590,837 B1
(45) Date of Patent: Jul. 8, 2003

(54) APPARATUS AND METHOD FOR ANNOTATING AN OBJECT WITH AN AUDIO MESSAGE

(76) Inventor: Lawrence M. Kaplan, 2129 Clover Rd., Northbrook, IL (US) 60018

( * ) Notice: Subject to any disclaimer, the term of this patent is extended or adjusted under 35 U.S.C. 154(b) by 0 days.

(21) Appl. No.: 09/316,745

(22) Filed: May 21, 1999

(51) Int. Cl.[7] .............................. G11B 19/00; G06K 5/00
(52) U.S. Cl. ............................... 369/25.01; 178/18.03; 235/487
(58) Field of Search .......................... 369/25.01, 26.01, 369/29.02, 47.23, 14, 64, 97; 178/18.03, 18.09; 704/500; 235/436, 487, 454, 472, 462.15; 709/231, 236; 714/752

(56) References Cited

U.S. PATENT DOCUMENTS

| | | | | |
|---|---|---|---|---|
| 5,243,149 A | * | 9/1993 | Comerford et al. ............ | 178/18 |
| 5,710,813 A | | 1/1998 | Terui et al. ..................... | 380/4 |
| 5,754,195 A | | 5/1998 | Yokono ......................... | 347/19 |
| 6,027,026 A | * | 2/2000 | Husain et al. ............... | 235/487 |
| 6,202,060 B1 | * | 3/2001 | Tran .............................. | 707/3 |
| 6,249,765 B1 | * | 6/2001 | Adler et al. ................. | 704/500 |

OTHER PUBLICATIONS

"Quickionary Translators and Dictionaries" Seiko advertisement, *SkyMall* magazine (1999).
"ICD–70 Voice File Recorder" advertisement, Sony Electronics Inc. (1998).
"You talk. It types. Anywhere" Olympus D1000 Digital Voice Recorder advertisement, Olympus America (1998).

* cited by examiner

Primary Examiner—Ali Neyzari

(57) ABSTRACT

An apparatus and method for annotating an object, such as a document, with an audio event is disclosed. The apparatus comprises a recording component that makes a recording of an audio event, a data code applicator that places a data code on the object after the recording of the audio event is made by the recording component, a data code reader that reads the data code from the object, and a playback component that plays back the recording of the audio event after of the data code is read from the object by the data code reader.

23 Claims, 7 Drawing Sheets

APPARATUS AND METHOD FOR ANNOTATING AN OBJECT WITH AN AUDIO MESSAGE

APPARATUS AND METHOD FOR ANNOTATING AN OBJECT WITH AN AUDIO MESSAGE

BACKGROUND OF THE INVENTION

The present invention relates to a method and apparatus for improving the utility of working with documents and more particularly, the present invention relates to an apparatus and method that facilitates adding audio annotation to documents or other objects.

The use of computers and computer networks in various fields, such as business, academics, and entertainment has facilitated the exchange of information electronically. Nevertheless, persons rely to a great extent on paper copies of documents. In fact, the widespread use of computers and computer networks may have the result that even more physical paper copies of documents are produced because documents are easier to generate using computers. Moreover, it is recognized that paper copies of documents are better-suited and easier to use than electronic versions of the same documents for presenting many kinds of exchanges of information. Therefore, it is expected that the use of physical paper documents will continue to increase in the future.

When reviewing or revising paper copies of documents, one frequently desires to make comments or notes about one's observations about what is presented in the document. These comments or notes may be for the benefit of the reviewer. For example, one might want to remind oneself at a later time about an observation or thought that occurred at the time the document was previously reviewed. Alternatively, the comments may be for the benefit of another person who will review the document at a later time. Various means are available that enable persons to perform these kinds of tasks. For example, a person may simply write a few comments directly on the document. Another popular way to make comments about a document is to use Post-It®-style notes. These methods work well and serve many of the needs that persons have for making notes or comments about paper documents.

Although these methods work well for many applications, there is room for improvement. For example, writing notes by hand is time-consuming. Furthermore, writing directly on a document is limited by the amount of space on the document. Similar constraints are associated with using Post-It®-style notes. Accordingly, there exists a need for an apparatus and method that facilitates note-taking in connection with documents or other physical objects. Furthermore, there exists a need to enhance the exchange of information using a paper document medium.

SUMMARY OF THE INVENTION

To address these and other objectives, the present invention comprises an apparatus and method for annotating an object, such as a document, with an audio event. The apparatus comprises a recording component that makes a recording of an audio event, a data code applicator that places a data code on the object after the recording of the audio event is made by the recording component, a data code reader that reads the data code from the document, and a playback component that plays back the recording of the audio event after the data code is read from the document by the data code reader.

DETAILED DESCRIPTION OF THE PRESENTLY PREFERRED EMBODIMENTS

I. FIRST EMBODIMENT

Figure 1:
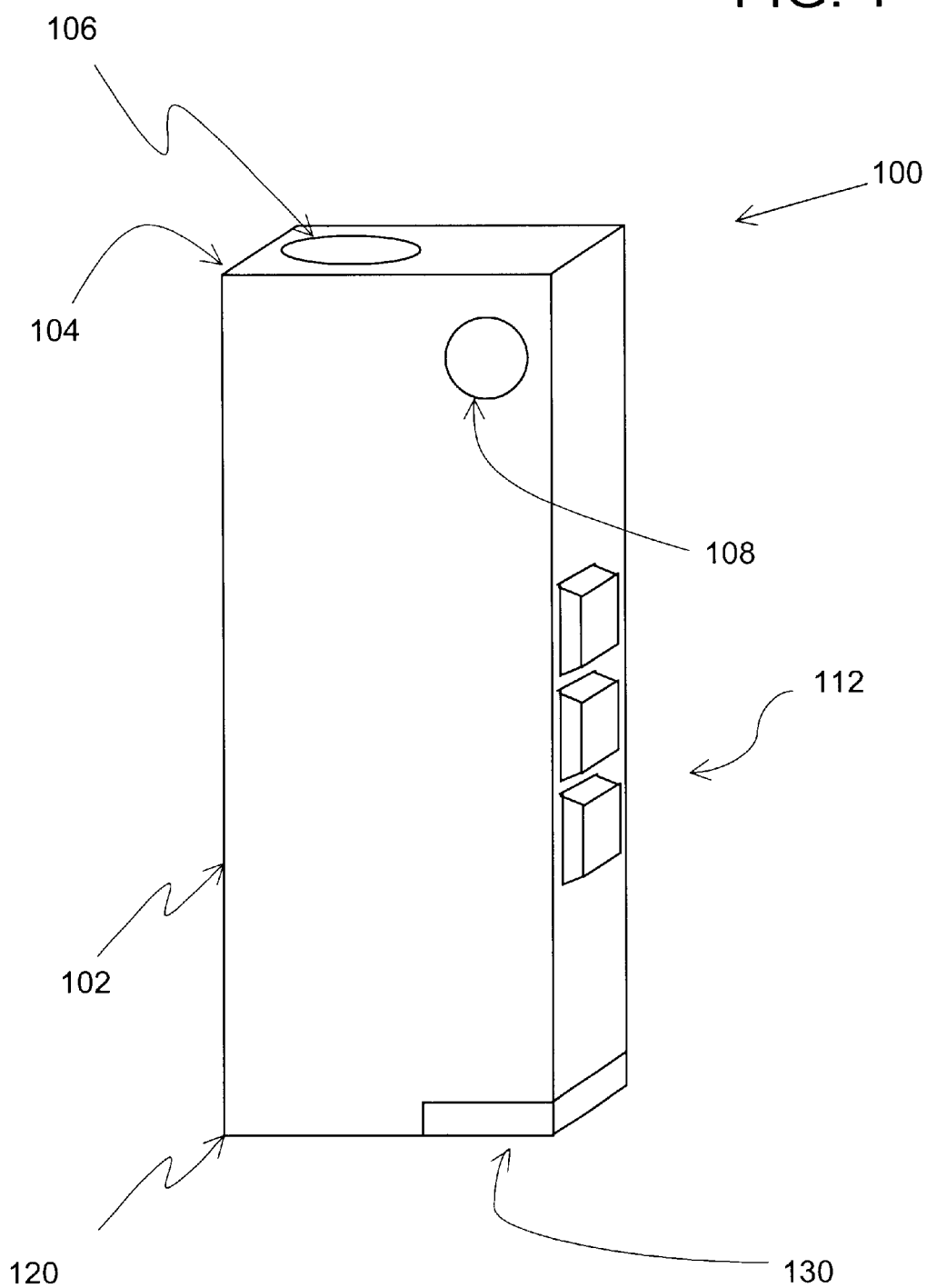
FIG. 1 is a perspective view of an audio annotator according to a first embodiment.

Referring to FIG. 1, a first embodiment of an audio annotator 100 is shown. The audio annotator 100 includes a housing 102. The housing 102 is sized appropriately for holding in a person's hand. For example, the housing 102 may be approximately the same size as a tape recorder used for dictation. Located at one end 104 of the housing 102 is a microphone 106. Located along one of the sides of the housing 102 is a speaker 108. Also located along one of the sides of the housing 102 are operator controls 112. The operator controls 112 may take the form of buttons, switches, and so on. The operator controls 112 are located along the housing 102 so that they are easily accessible for manual manipulation by a person holding the housing 100 while speaking into the microphone 106. The controls provide for typical recording and playback functions, such as pausing the recording, stopping the recording, erasing the recording, re-recording, and so on.

Located at an end 120 of the housing 102 opposite the microphone 106 are read and write head(s) 130. The read and write head(s) 130 may use any of various kinds of mechanisms or technologies for imparting a code or indicia onto a surface of an object, such as a sheet of paper, and subsequently reading the code or indicia from the surface. The kinds of mechanisms or technologies that may be used for the read and write head(s) 130 are described in more detail below.

Figure 2:
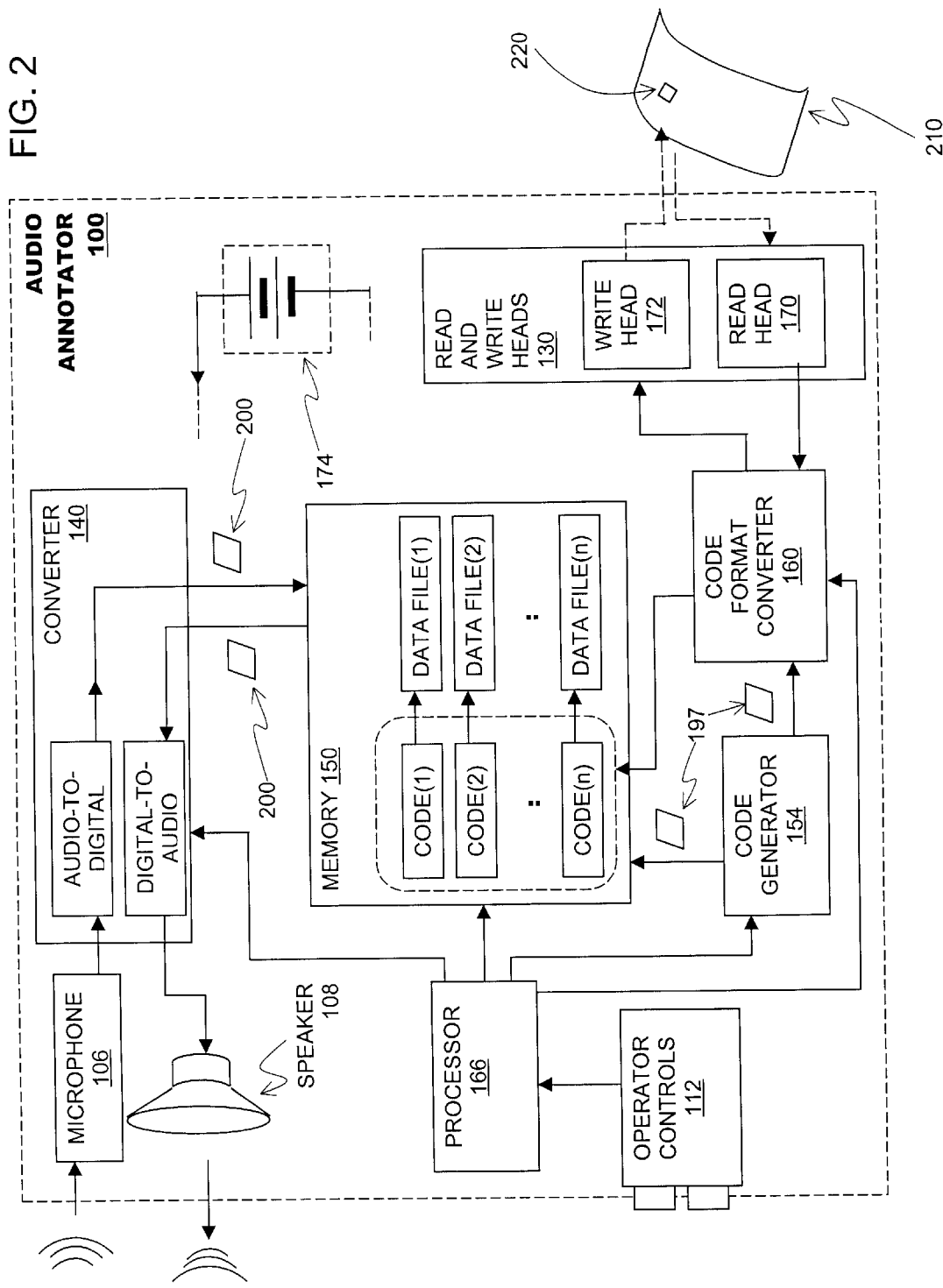
FIG. 2 is a block diagram showing components of the embodiment of FIG. 1.

Referring to FIG. 2, there is a block diagram showing the component parts of the audio annotator 100. Generally, the audio annotator includes components that provide the functions of recording an audio event, applying a data code onto an object, such as a document, after the audio event is recorded, reading the data code from the object, and playing back the audio event after the data code is read from the object. The components shown in FIG. 2 represent one way that these functions can be implemented. It is understood that these functions can be implemented with other components.

Referring to FIG. 2, the audio annotator 100 includes a means 140 by which sound, received by the microphone 106, is converted into a data format suitable for storage on a medium, such as in a data storage device. In the embodiment of FIG. 2, the converting means 140 also performs the reverse function of converting data from a format in which it is stored in the medium, such as the data storage device, into a signal, such as an analog signal, that can be converted into audible sound at the speaker 108. The converting means 140 may include an analog-to-digital (A/D) converter, a digital-to-analog converter, a digital sampler, and digital signal processing hardware and/or software. All these components are known to those of skill in the art. For example, these components may be similar to those in a digital telephone answering machine or a digital dictation recorder.

The audio annotator 100 also includes a storage memory 150. The storage memory 150 is of a type that can be used as a storage medium for storing digital data, such as digital data files or portions thereof, received from the converting means 140. The memory 150 is writable, so that digital data can be written into the memory 150. In a preferred embodiment, the memory 150 is also rewritable so that data stored in the memory 150 at various storage locations can be erased and the memory storage locations previously used for old data can be written over with new data. Further, the memory 150 is also randomly addressable, at least in part, so that data stored in different locations in the memory 150 can be selectively accessed, read out, and provided to the converting means 140. The memory 150 may be non-volatile or may be volatile. The memory 150 may be implemented using any of various kinds of technologies. For example, the memory 150 may be similar to the kinds of memories used in digital telephone answering machines or digital dictation recorders.

The audio annotator 100 includes a code generator 154. The code generator 154 may be implemented using a software routine or alternatively the code generator 154 may be implemented using hardware. The code generator 154 generates a plurality of unique codes. The code generator 154 may generate unique codes by generating numbers in sequence, or alternatively the code generator 154 may generate unique codes using a combination of time and date, or alternatively the code generator 154 may generate codes using various other techniques.

The audio annotator 100 also includes a code format converter 160. The code format converter 160 converts codes generated by the code generator 154 into a data format suitable for storage and writing on an object, such as a document. For example, the code format converter 160 may convert the codes generated by the code generator 154 into other formats, such as bar codes, magnetic codes, serial codes, optical codes, etc. Alternatively, the code format converter 160 may format the output of the code generator 154 as standard English alphanumeric characters, which can then be applied to the document.

The audio annotator 100 also includes a processor 166. The processor 166 is operatively coupled to the converter 140, the memory 150, the code generator 154, and the code format converter 160. The processor 166 may also be coupled to other components. The processor 166 includes appropriate programming that controls the operations of the components coupled thereto. The programming executed on the processor 166 may be stored in a non-volatile memory, firmware, or other storage means associated with the processor 166. The processor 166 may be of any type suitable for use in an electronic appliance or apparatus.

The processor is operatively connected to the operator controls 112. Manipulation of the operator controls 112 provides signals to the processor 166 which are interpreted by appropriate programming executed on the processor 166 to cause operation of the functions of the audio annotator 100.

As mentioned previously, the audio annotator 100 also includes read and write heads 130. The read and write heads 130 may be combined into a single assembly or may be separate components. In one embodiment, the read and write heads 130 include a read head portion 170 and a write head portion 172.

The write head portion 172 is coupled to the code format converter 160 and may also be coupled to the processor 166. A feature of the write head portion 172 is that it can apply a code, mark or other indicia onto a surface which is not otherwise used as an electronic data storage medium. In one embodiment, the write head portion 172 is comprised of a print head. The print head may use ink jet or ink spray technology, laser printing technology, thermal printing technology, or any other technology that allows a mark or indicia to be affixed or applied onto a surface of an object, such as a sheet of paper. The write head portion 172 may also include or be coupled to a source of ink, toner, etc., as necessary. The write head portion 172 may also apply a magnetic strip or stripe onto the surface of the object. The magnetic strip or stripe would be similar to the kind found on credit cards. To implement this technology, the write head portion 172 may be coupled to source of magnetic ink or other material.

In one embodiment, the read head portion 170 is a scanner head. The read head portion 170 is coupled to the code format converter 160 and may also be coupled to the processor 166. The read head portion 170 may use any technology that allows reading a physical mark or indicia from a surface of an object, such as a sheet of paper. The read head portion 170 may use scanning (i.e., laser) technology such as the type used at checkout counters to scan bar codes from packages. Alternatively, the read head portion 170 may use scanning technology similar to that used in fax machines. If the data code applied to the document is magnetically-readable, such as a magnetic strip or stripe, the read head portion 170 may include appropriate scanning technology that can read the magnetic strip or stripe. This technology is similar to the kind used in credit card readers.

The audio annotator 100 is preferably powered by a portable energy source, such as one or more batteries 174. The batteries 174 may be rechargeable or disposable. The batteries are operatively connected to provide power to the components of the audio annotator 100 that need it. The audio annotator may also be powered by line current.

Operation

Generally, the audio annotator is used to associate an audio event with an object, such as a paper document. For purposes of this disclosure, an audio event includes several seconds or several minutes of spoken words, comments, sounds, music, or other audible activity that can be heard and/or captured on a recording medium. Use of the audio annotator 100 to associate spoken comments with a document is disclosed in the following example, which is described in connection with FIGS. 1, 2 and 3.

A person wishes to provide comments about a document 210 (in FIG. 2) that the person has before him/her. A person operates the controls 112 of the audio annotator 100 to begin a recording session (Step 190 in FIG. 3). (Alternatively, the audio annotator may be voice-activated so that it automatically enters a recording mode when a person speaks into the microphone.) When the audio annotator 100 is used for a recording session, the person speaks into the microphone 106. The person's speech is received by the microphone 106 of the audio annotator and provided to the converter 140 (in FIG. 2). The converter 140 converts the signal from the microphone 106 into data 200, such as digital data (Step 192 in FIG. 3). The audio annotator 100 may buffer the converted audio stream, as necessary (Step 194 in FIG. 3). The memory 150 of the audio annotator 100 may be used for this buffering function or another memory may be included in the audio annotator for this purpose. The converter 140 may also compress the digital data to minimize the data storage requirements, using audio compression techniques known in the art.

Figure 3:
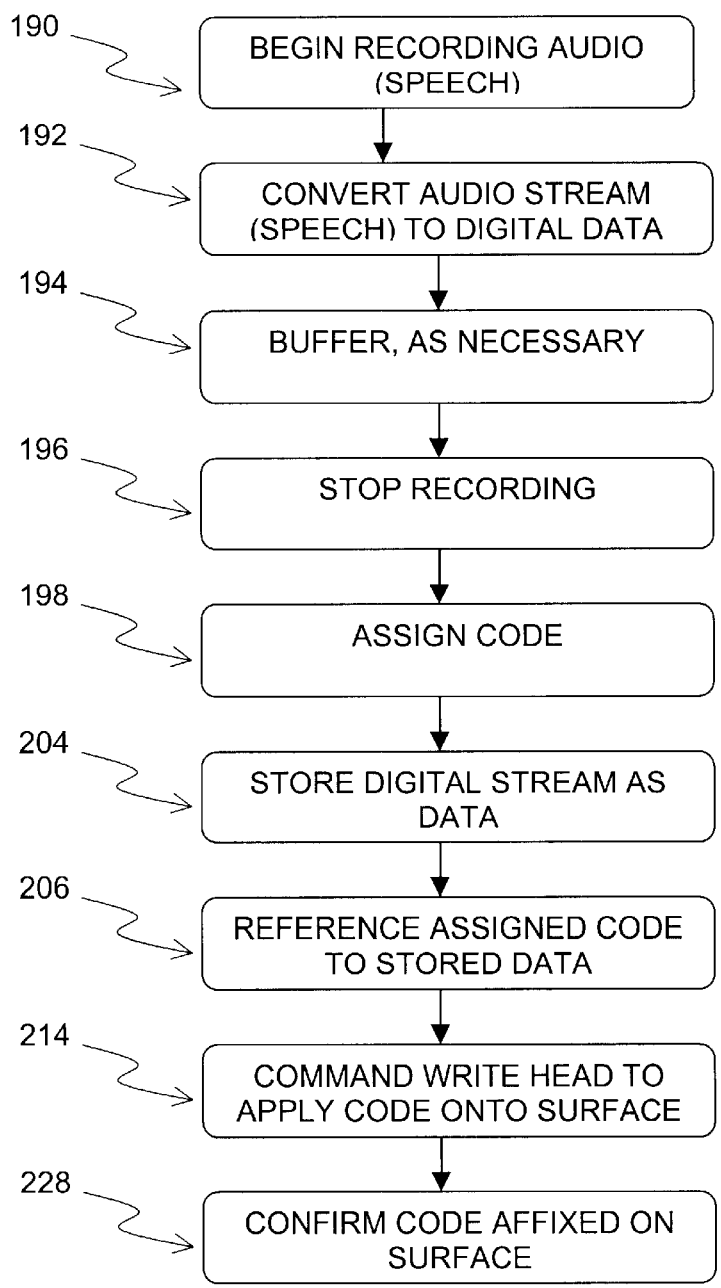
FIG. 3 is a flow chart showing steps of operation for making an audio annotation using the embodiment of FIG. 1.

When the person is:finished with speaking the message, the person operates the controls 112 to indicate that the recording session is finished (Step 196 in FIG. 3). At this point, the audio annotator 100 may provide the person with an opportunity to discard the audio event in case the person changes his/her mind. The audio annotator 100 includes appropriate programming to provide for the function of discarding the audio event prior to applying a data code onto the document. Also at this point, the audio annotator 100 may provide the person with an opportunity to review the recorded audio event. The audio annotator 100 may also include appropriate programming to provide this playback review function. If the person wishes to review the recorded audio event, the data representing the converted audio event may be played back.

Assuming that the person wishes to save the audio event and annotate a document with the audio event, the person so indicates by appropriate manipulation of the controls 112. When the person indicates that the audio event is ready for saving and annotating a document, the audio annotator 100 generates a code 197 using the code generator 154 (Step 198 in FIG. 3). The code 197 is associated with the digital data 200 representing the converted audio stream. The code 197 may be associated with the digital data 200 representing the converted audio event using a look up table, an index table, pointers to a starting address of the digital data message 200 in memory, offsets into blocks of the memory 150, or any other addressing means. The data 200 representing the converted audio event is stored in the memory 150 (Step 204) and the code 197 associated with the data 200 representing the converted audio event is also stored so that the code 197 is associated with the stored data 200 (Step 206).

At approximately the same time that the person indicates that the message is ready for saving, the person positions the write head 172 of the audio annotator 100 directly adjacent to or upon the surface of the document 210 (in FIG. 2) or other object being annotated. The code 197 is converted into a suitable format for affixing to a surface by the code format converter 160. When located within the appropriate distance from the document being annotated, the write head 172 receives a command to apply the converted code 197 onto the document 210 (Step 214 in FIG. 3). The command may be provided by the person operating the audio annotator using the operator controls 112. Alternatively, the write head 172 may include a sensor (e.g., an optical sensor or a pressure sensor) that can sense when it is at the proper writing distance and output a write command accordingly.

Upon receiving the command, the write head 172 applies the converted code 197 onto the document 210. The converted code is applied as a mark or indicia (referred to as a data code mark 220). If the write head 172 is implemented using a print head, such as an ink jet print head, the data code mark 220 is sprayed onto the document 210. The data code mark 220 may be applied to the document 210 with visible ink, invisible ink, magnetic ink, toner or other kinds of material. The location at which the data code mark 220 is applied is preferably visible so that a person holding the document can observe that the data code mark 220 has been applied at that location.

Upon applying the data code mark 220 onto the document 210, the audio annotator 100 may be operated in a test mode to confirm that that the data code mark 220 has been properly applied (Step 228 in FIG. 3). In the test mode, the audio annotator 100 may use the read head 170 to test whether the data code mark 220 can be read from the document 210. If the data code mark 220 cannot be read from the document 210, an indication is provided to the person using the audio annotator 100 indicating that the data code mark 220 has not been successfully applied. A stored audio message included in the audio annotator may be played back to inform the user of an unsuccessful application of the data code mark. The person may be invited to try applying the data code mark again.

If operation of the audio annotator 100 in the test mode can successfully read the data code mark 220 from the document 210, the audio annotator may provide an indication to the user that the data code mark 220 has been successfully applied to the document 210. The audio annotator 100 may play back another stored message to indicate successful application of the data code. The person may then use the audio annotator 100 to affix another data code annotation to another document or even to the same document.

Figure 4:
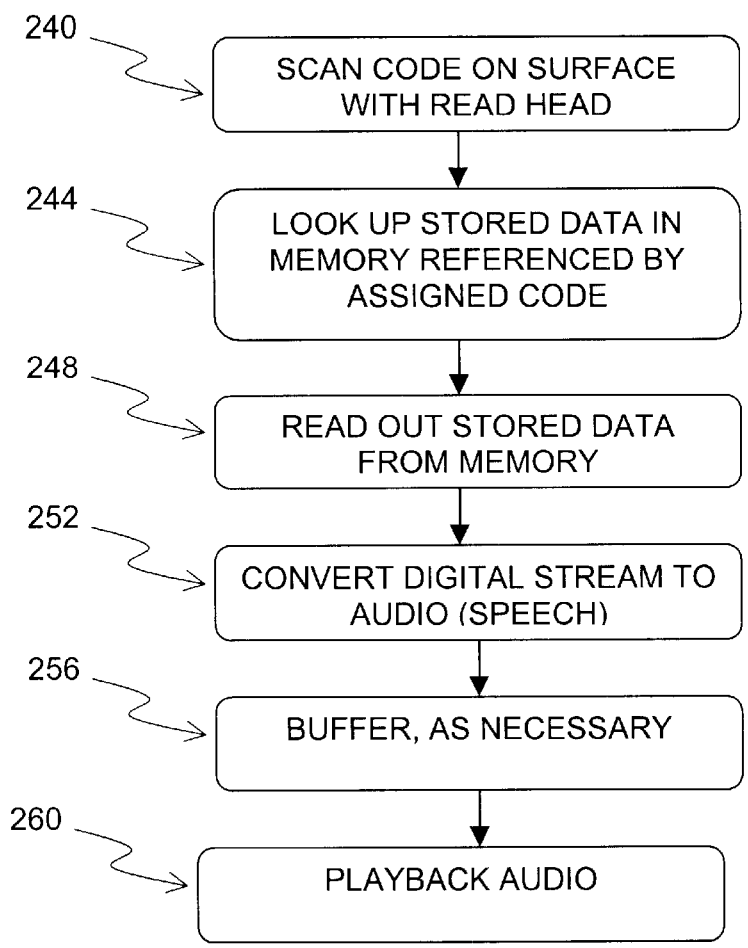
FIG. 4 is a flow chart showing steps of operation for playing back the audio annotation made using the steps of FIG. 3.

Use of the audio annotator to play back an annotated message is described in connection with FIGS. 1, 2, and 4. The person using the audio annotator for this purpose may be the same person who made the recording or may be another person. In FIG. 4, the person wishing to hear the audio annotation associated with the document 210 manipulates the controls 112 to put the audio annotator in scanning and playback mode. When the audio annotator is in scanning and playback mode, the user scans the data code mark 220 on the document 210 using the read head 170 of the audio annotator 100 (Step 240 in FIG. 4).

Upon reading the scanned data code mark from the document with the read head 170, the data code is converted to extract the data code 197 therefrom. The code converter 160 may be used to perform this function. This function is the reverse of the function performed by the code format converter 160 when the data code was affixed to the document. Alternatively, the audio annotator may include another component to perform the function of converting the scanned data code to extract the digital code therefrom.

After the digital code 197 is extracted from the scanned data code signal, the digital data message 200 associated with the digital code 197 is identified (Step 244). As mentioned above, when the code 197 was stored, it was associated with the digital message 200. Using the means by which the digital code 197 was associated with the digital data message 200, the digital data message 200 is located and accessed.

Once the digital data message 200 corresponding to the digital code 197 is found and accessed, it is read from memory and converted into an audio stream signal (Steps 248 and 252). The conversion of the digital data 200 to the audio stream signal may be performed by the converting means 140 or a similar component. The digital data being read out from memory may be buffered, as necessary (Step 256). The audio stream signal formed by the conversion of the digital data is played back over the speaker 108 (Step 260). Converting and playing back the data comprises playing back of the previously recorded audio event.

With the embodiment of the audio annotator described in connection with FIGS. 1–4, a person can associate an audio event with a document. The data code affixed to the document allows the audio event, which is stored in the audio annotator, to be identified and played back. Thus, using an embodiment of the audio annotator, a person can record comments, observations, etc., about a document that he/she is reviewing. The comments are stored in the audio annotator and a data code associated with the comments is applied to the document. The comments made by the person are secure since they are stored with the audio annotator and not with the document.

In the embodiment of FIGS. 1–4, the various components are sized so that an hour or more of audio comments can be associated with various objects (i.e., documents) and stored in the memory or other storage medium of the audio annotator. A memory of 1M may be suitable for this purpose. The audio annotator can be operated to erase old messages that the user no longer wishes to keep. In one embodiment, the memory is provided in removable, replaceable units so that after one memory unit is filled, another memory unit can be used to replace it. When multiple memories are used in this manner, the audio annotator includes a means to identify the different removable memory units so that the proper memory unit can be installed in the audio annotator in order to playback a message associated with a particular code.

In another alternative mode of operation, the user may access a stored audio event by manually entering the data code associated with the stored audio event into the audio annotator. The input panel may be used for this purpose. In this manner, stored audio events can be reviewed even if the documents upon which the associated data codes have been applied are not physically available.

In yet another mode of operation, the audio annotator may also include appropriate programming to provide for the function of saving an audio event without immediately applying a data code onto the document. In this alternative mode of operation, a data code is generated at another (earlier or later) time, associated with the previously recorded audio event, and then applied to a document.

II. SECOND EMBODIMENT

Figure 5:
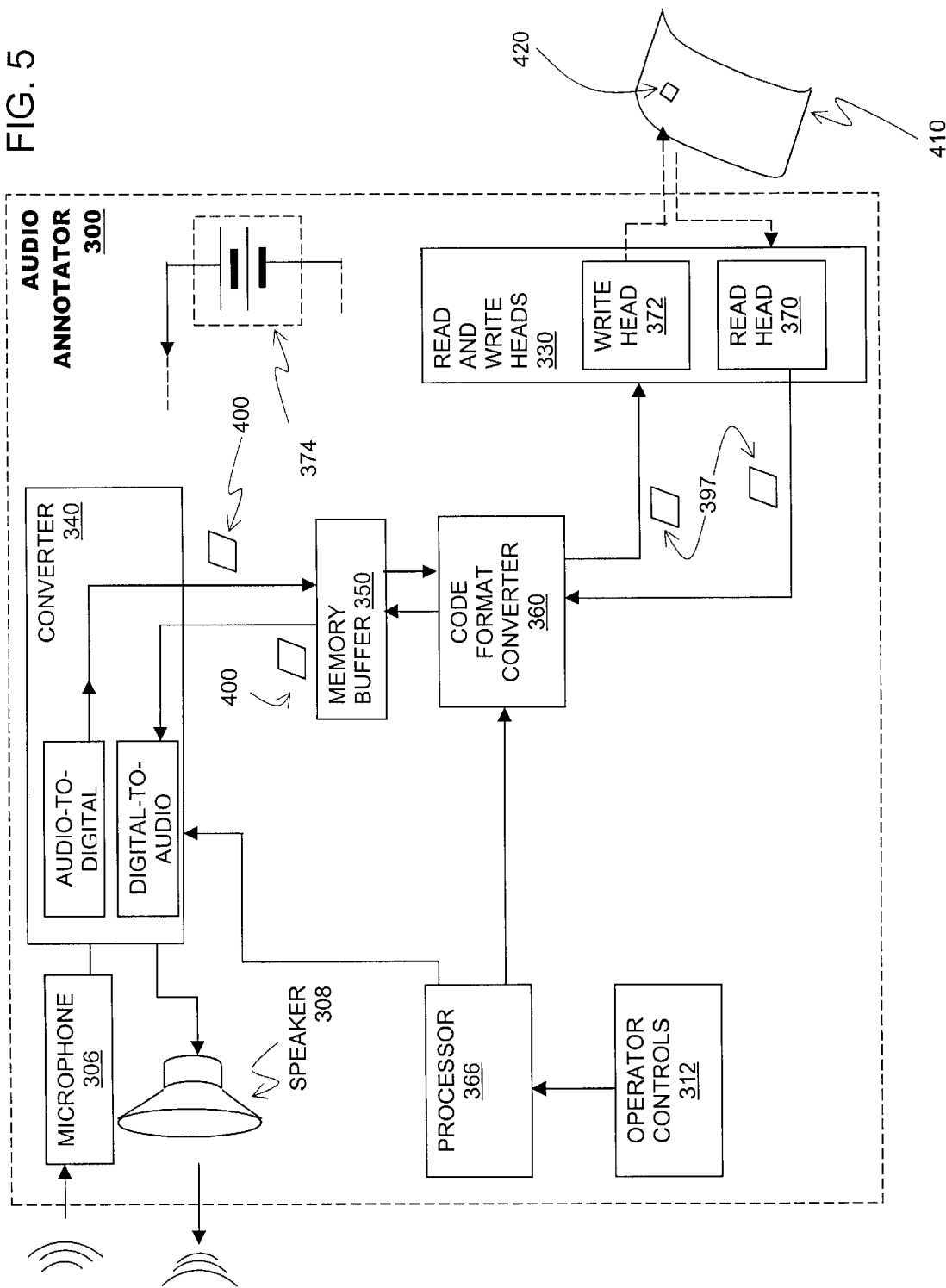
FIG. 5 is a block diagram showing another embodiment of an audio annotator.

FIG. 5 shows a block diagram of an alternative embodiment 300 of an audio annotator. The embodiment shown in FIG. 5 may have an outward appearance that is similar or identical to the first embodiment shown in FIG. 1.

Referring to FIG. 5, there is a block diagram showing the component parts of the audio annotator 300. The audio annotator 300 includes a means 340 by which sound, received by a microphone 306, is converted into a data format suitable for storage. The converting means 340 also performs the reverse function of converting data from a storage format into a signal, such as an analog signal, that can be converted into audible sound at a speaker 308. The converting means 340 may be similar or identical to the converting means 140 described in connection with the first embodiment. The converting means 340 may include an analog-to-digital (A/D) converter, a digital-to-analog converter, a digital sampler, and digital signal processing hardware and/or software.

The embodiment of the audio annotator 300 also includes a code format converter 360. The code format converter 360 converts the data generated by the data converter 340 into a data format suitable for storage and writing on a surface. The code format converter 360 may be similar or identical to the code format converter 160 in FIG. 2. For example, the code format converter 360 may convert the data generated by the converting means 340 into bar codes, magnetic serial codes, optical codes, alphanumeric characters, etc.

The audio annotator 300 also includes a processor 366. The processor 366 may be similar to the processor 166 in FIG. 2. The processor 366 is operatively coupled to the converter 340, the memory 350, the code format converter 360, and may be coupled to the other components. The processor 366 includes appropriate programming that controls the operations of the components coupled thereto.

The audio annotator 300 also includes operator controls 312. The operator controls 312 are operatively connected to the processor 366. Manipulation of the operator controls 312 provides signals to the processor 366 which are interpreted by appropriate programming executed on the processor 366 to cause functioning of the audio annotator 300 in accordance with inputs from the operator.

The audio annotator 300 also includes read and write heads 330. The read and write heads 330 include a read head portion 370 and a write head portion 372. The read and write heads 370 and 372 may be similar or identical to the read and write heads 170 and 172 described in connection with the first embodiment.

The audio annotator 300 also includes a memory buffer 350. The memory buffer 350 is coupled to the data converter 360 and is used to buffer the data stream, as explained below.

The audio annotator 300 is also preferably powered by a portable energy source, such as batteries 374, but the audio annotator 300 may also be powered by line current.

Operation

Operation of the second embodiment of the audio annotator 300 is similar in some respects to the first embodiment described in connection with FIGS. 1–4. Like the first embodiment of FIGS. 1–4, the embodiment of FIG. 5 applies a data code onto a surface of an object, such as a document, in order to make an audio annotation regarding the object. However, unlike the embodiment of FIGS. 1–4, the embodiment of FIG. 5 stores the entire audio event in the data code applied to the surface of the document. Thus, with the embodiment of FIG. 5, the converted audio event is not necessarily (permanently) stored in a memory medium of the audio annotator, but instead is included in the data code affixed or applied onto the surface of the document. As in the first embodiment, the data code can be affixed or applied onto the surface of the document or other object by any of various means. For example, the data code can be affixed or applied onto the surface of the document or other object using ink, magnetized ink, optical marks, toner, codes, etc.

Use of the audio annotator 300 is illustrated in the following example, which is described in connection with FIGS. 5–7.

Figure 6:
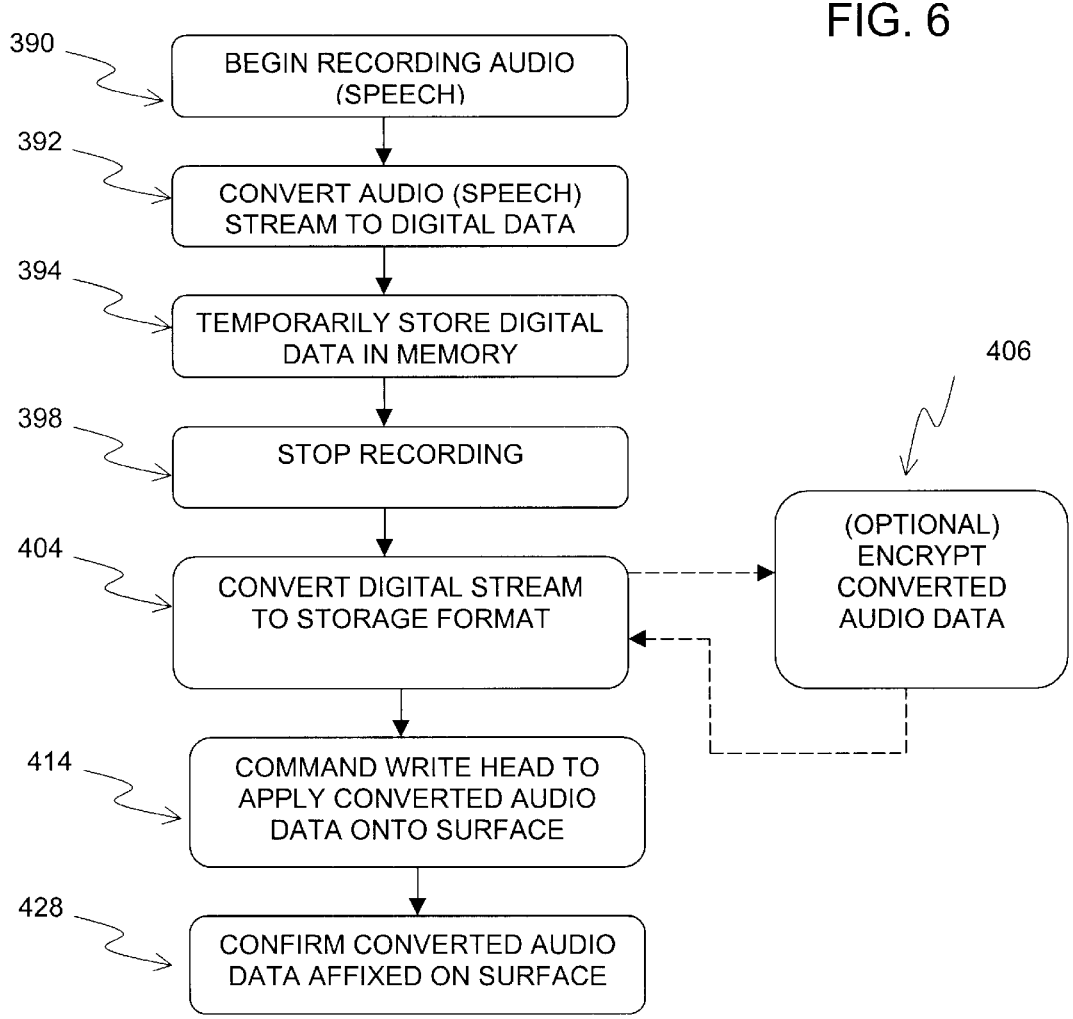
FIG. 6 is a flow chart showing steps of operation for making an audio annotation using the embodiment of FIG. 5.

A person operates the controls 312 of the audio annotator 300 to begin a recording session (Step 390 in FIG. 6). As in the first embodiment, the person wishes to associate an audio event (such as comments) with a document 410 (in FIG. 5) that the person has before him/her. The person speaks into the microphone 306. The person's speech is received by the microphone 306 of the audio annotator 300 and provided to the first converter 340 (in FIG. 5). The converter 340 converts the signal from the microphone 306 into digital data 400 (Step 392 in FIG. 6). The data representing the converted audio stream is temporarily stored in the memory 350 (Step 394 in FIG. 6). The converter 340 may also compress the digital data to minimize the data storage requirements.

When the person is finished with speaking the message, the controls 112 are operated to indicate that the recording session is finished (Step 398 in FIG. 6). The converted audio stream is converted again by the data code format converter 360 into a suitable format for affixing to a surface (Step 404 in FIG. 6). At this point, the data being applied to the document may be encrypted. The encryption of the data being applied to the document is optional. The audio annotator may be configured so that the data being applied to the document is encrypted automatically or alternatively, the audio annotator may allow the user to select whether encryption should be performed. If the data being applied to the document is to be encrypted, the encryption is performed before the data is applied to the document (Step 406 in FIG. 6). The encryption step may be performed while the data is still in the memory 350. Any of various kinds of encryption may be used.

After the data is encrypted, if desired, the converted audio event is then applied as a data code mark 420 onto the document 410. The person indicates that the message is ready for applying and positions the write head 372 of the audio annotator 300 directly adjacent to or upon the surface of the document 410 (in FIG. 5) or other object being annotated. The write head 372 receives a command to apply the data code mark 420 onto the document 410 (Step 414 in FIG. 6). Upon receiving the command, the write head 372 applies the data code mark, which includes the entire converted audio event, onto the document 410. If the write head 372 is implemented using a print head, the data code mark 420 is sprayed onto the document 410. If the write head 372 is implemented using a magnetic head technology, the data code mark 420 is applied as a magnetized strip or stripe onto the document 410. The location at which the data code mark 420 is applied is preferably visible.

Upon applying the data code mark 420 onto the document 410, the audio annotator 300 may be operated in a test mode to confirm that that the data code mark 420 has been properly applied as described in connection with the first embodiment (Step 428 in FIG. 6).

Use of the audio annotator 300 to play back an annotated message is described in connection with FIGS. 5 and 7. The person using the audio annotator for this purpose may be the same person who made the recording of the audio event or may be another person. Because the audio event is stored directly on the document (and not in the audio annotator as in the first embodiment), anyone with an audio annotator can play back the audio event applied onto the document unless the audio annotation was encrypted, as described above. If the audio annotation was encrypted, another person may play back the audio event provided that he/she has the password or key used to encrypt the data from which the data code was made.

Operation of the second embodiment for play back of an audio event is described in connection with FIG. 7. In FIG. 7, the person wishing to hear the audio event associated with the document 410 manipulates the controls 312 of an audio annotator (which may be same audio annotator used to apply the annotation or which may be another audio annotator) to put the audio annotator in scanning and playback mode. When the audio annotator 300 is in scanning and playback mode, the user scans the data code mark 420 on the document 410 using the read head 370 of the audio annotator 300 (Step 440 in FIG. 7).

Figure 7:
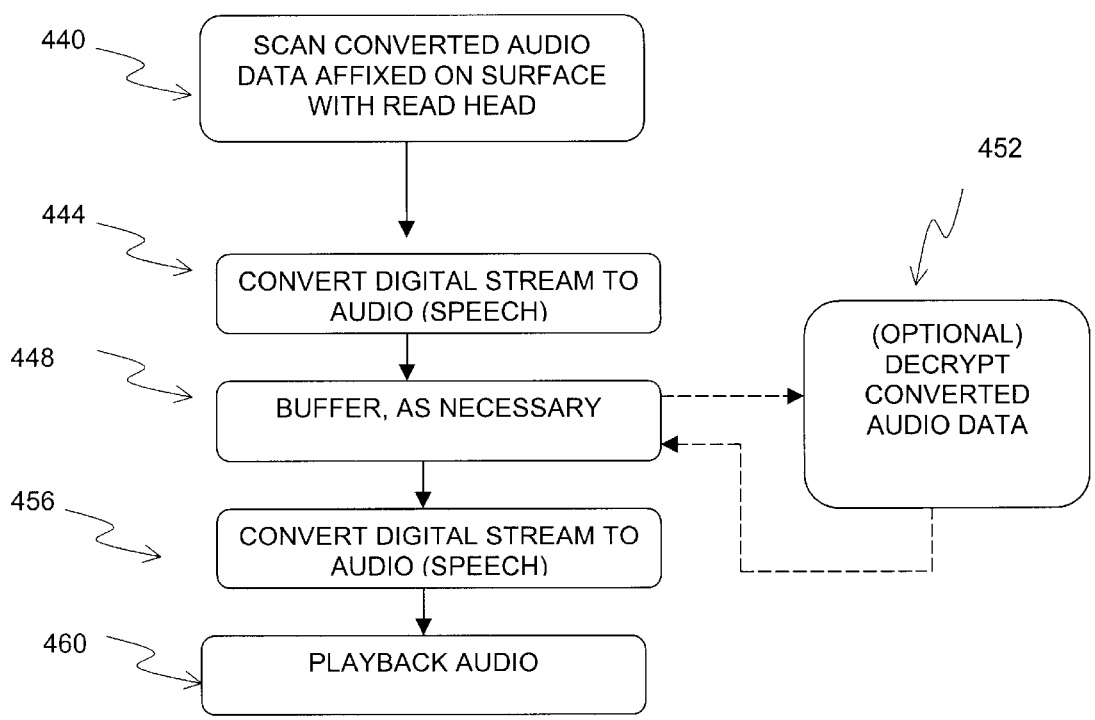
FIG. 7 is a flow chart showing steps of operation for playing back the audio annotation made using the steps of FIG. 6.

Upon reading the scanned data code mark 420 from the document 410 with the read head 370, the data code mark is converted using the code format converter 360 (Step 444 in FIG. 7). This function is the reverse of the function performed by the code converter 360 when the data code was affixed to the document.

When the data code mark is converted from the format in which it is stored on the document, it may be temporarily stored in a memory buffer, as necessary (Step 448 in FIG. 7). At this stage, the digital data is decrypted, if necessary (Step 452 in FIG. 7). Then, the data is converted into an audio stream signal (Step 456 in FIG. 7). The conversion of the digital data 400 to the audio stream signal may be performed by the converting means 340 or a similar component. The audio stream signal formed by the conversion of the digital data is played back over the speaker 308 (Step 460 in FIG. 7).

With the embodiment of the audio annotator 300 described in connection with FIGS. 5–7, a person can associate an audio event with an object. The data code affixed to the object allows the audio event, which is stored on the object, to be played back. Thus, using an embodiment of the audio annotator, a person can record comments, observations, etc., about an object, such as a document, that he/she is reviewing. The comments are stored as a data code applied to the object. The comments made by the person can be reviewed by another other person, including a plurality of other persons, since the comments are included on the object. The comments may be made secure using the encryption features of the audio annotator.

III. OTHER EMBODIMENTS

In the embodiments discussed above, the audio annotator was used to apply annotations to documents. It should be appreciated that the embodiments of the audio annotator can be used to apply annotations to any surface. For example, the audio annotator can be used to apply annotations to books, boxes, packages, CD-ROM disks, and so on.

A feature associated with embodiments of the audio annotator that use nonmagnetic data codes to store either an encoded audio event or a reference to an audio event stored in the audio annotator is that the data code can be distributed with copies of the document. For example, in an embodiment in which the entire audio event is stored in the data code on the document, if the document is copied after the data code is applied, the data code is copied with it. Thus, each of a plurality of other persons to whom copies of the document are distributed receives not only a copy of the document, but a copy of the data code as well. Each of these other persons can use his/her own audio annotator to decode the audio annotation included in the data code located on his/her own respective copy of the document. In this manner, comments of one person regarding a document can be distributed to and shared with many other individuals.

In one of the embodiments described above, the audio event was stored in a storage medium, such as a memory, included in the audio annotator. In alternative embodiments, other types of storage media may be used to store the audio event in the audio annotator. These other types of storage media include tapes (magnetic), hard disks, floppy disks, or other media suitable for data storage. These types of storage media may be adapted in size for use in a hand-held device. In another alternative embodiment, the data storage medium may be located remotely and made available by means of a wired or wireless communication connection.

In the embodiments described above, various means were disclosed for applying a data code onto a document. In alternative embodiments, the data code may be applied first to a supplementary surface that is then applied to the document or other object to which an audio event is desired to be associated. The supplementary surface may be designed to facilitate holding the data code. The supplementary surface may include an adhesive (or self-adhesive side that facilitates application to various surfaces.

In one version of this alternative, the supplementary surface is a thin portion of tape (or a stamp or a sticker) having a metallic surface and an adhesive surface. In this version, the write head includes a head similar to those used in disk drives or tape recorders. The write head applies the data code onto the portion of tape (or stamp or sticker). Specifically, the write head imparts magnetic variations to the metal surface of the tape or stamp to contain the data code thereon. After the data code is magnetically written into the magnetic surface of the tape, the portion of the tape (or stamp or sticker) is dispensed from the audio annotator and applied to the surface of the document. In other respects, this embodiment operates similarly to the prior described embodiments.

In an alternative version of an embodiment in which the audio annotator uses a supplementary surface for the data code, data codes can be pre-stored or pre-printed on the supplementary surface. If the data code is pre-stored or pre-printed on the supplementary surface, the write head component of the audio annotator may be omitted.

In further alternative embodiments, the supplementary surface can include other kinds of material upon which data can be written. For example, the supplementary surface can include a material upon which data can be written optically.

In yet another alternative, the audio events can also be pre-stored or pre-printed. According to this alternative, certain common messages can be pre-stored so that the need to record them can be omitted.

In another alternative, the data code can be applied to the object prior the recording of an audio message. Then, after the data code is applied to the document, a message can be recorded and associated with the data code that is already on the document.

In another alternative embodiment, the data code can be applied to the document by raising or indenting the surface of the document, in a Braille-like fashion. The write head would include an appropriate means to form raised or indented areas on the document and the read head would include appropriate means for detecting the raised or indented areas.

In an alternative embodiment, the audio annotator can be provided with a data port that enables it to be connected to another electronic device or system, such as a personal computer, a PDA, a computer network, etc. The data port can be implemented using any type of wired or wireless technology, such as a USB port, an IR port, etc. In an embodiment of the audio annotator that includes a data port, messages and/or data codes that are stored in an audio annotator can be transmitted or shared with other devices. For example, in an embodiment of the audio annotator that includes a data port, one or more audio messages that are stored in the audio annotator can be transmitted to another person over a data network to which the audio annotator is connected via the data port. The person to whom the messages have been transmitted can listen to the messages, send reply messages, forward the messages, etc. The person to whom the audio messages have been transmitted can use another audio annotator to listen to the audio messages or can listen to the messages by playing back the messages using the audio features of another device, such as a personal computer.

The audio annotator was described above as having a speaker from which the audio event can be played back. In alternative embodiments, the audio annotator can include other means of playing back the audio event, such as earphones.

In still another alternative embodiment, the audio annotator can be incorporated as a function or feature in a device that also provides other functions. For example, the audio annotator can be incorporated in a dictation recorder that is also used for conventional dictation functions. The audio annotator can also be incorporated in Palm-Pilot®-type devices.

The audio annotator can also be incorporated as an application or function on a computer. According to one alternative embodiment, a wand can be attached to a personal computer as a peripheral device. The wand can incorporate some or all of the functions of the various audio annotator embodiments, described above. For example, the wand can provide the read and write head functions and/or the recording functions. In another alternative in which the audio annotator is implemented on a personal computer, the data code can be applied to a document, in the header portion for example.

Another use the audio annotator is document production review by attorneys. Using an embodiment of the audio annotator, an attorney reviewing documents in a litigation can apply comments to the documents while maintaining the confidentiality of the comments.

It is intended that the foregoing detailed description be regarded as illustrative rather than limiting and that it is understood that the following claims including all equivalents are intended to define the scope of the invention.

I claim:

1. An apparatus for annotating an object with an audio event comprising:

a recording component that makes a recording of an audio event;

a data code applicator that places a data code on the object after the recording of the audio event is made by the recording component;

a data code reader that reads the data code from the object; and a playback component that plays back the recording of the audio event after the data code is read from the object by the data code reader.

2. The invention of claim 1 wherein the object on which the data code is placed is a paper document.

3. The invention of claim 1 wherein said recording component further comprises:

a microphone that receives audible sounds that comprise the audio event and converts said audible sounds into an electrical signal representative thereof; and a digital converter that receives the electrical signal from the microphone and converts the electrical signal into digital data.

4. The invention of claim 1 further comprising:

a memory into which the recording of the audio event is stored.

5. The invention of claim 1 further comprising:

a housing sized for holding in a human hand, and wherein said recording component, said data code applicator, said data code reader, and said playback component are contained in said housing.

6. The invention of claim 5 further comprising:

operator controls located along said housing.

7. The invention of claim 5 further comprising:

a battery located in said housing and operatively connected to said recording component, said data code applicator, said data code reader, and said playback component to provide power thereto.

8. The invention of claim 1 further comprising:
a code generator that generates a plurality of unique codes, wherein one of said plurality of unique codes is associated with the recording of the audio event.

9. The invention of claim 8 further comprising:
a code format converter responsive to said code generator and adapted to convert said unique codes into a data format suitable for application to objects.

10. The invention of claim 1 wherein the data code includes a code associated with data stored in a memory of the apparatus, wherein the data stored in the memory comprises the recording of the audio event.

11. The invention of claim 1 wherein the data code comprises the recording of the audio event.

12. The invention of claim 1 wherein the data code applicator comprises a print head.

13. The invention of claim 1 wherein the data code reader comprises a scanner.

14. An apparatus for annotating an object with an audio event comprising:
a housing;
a microphone located in said housing;
a data converter located in said housing and that receives a signal representative of an audio event from the microphone and converts said signal into storable data;
a data code applicator located in said housing, wherein said data code applicator applies a data code on a surface of the object after conversion of the signal representative of the audio event into storable data;
a code reader located in said housing and capable of reading data codes from surfaces of objects;
a playback device located in said housing, wherein said playback device converts data representative of the audio event back into an audio signal after the code reader has read a data code from the surface of the object;
manually-operable controls located on said housing and adapted to control operation of said recording apparatus; and
a battery located in said housing, wherein said battery supplies power for the data converter, the data code applicator, the code reader, and the playback device.

15. The invention of claim 14 further comprising a storage medium located in said housing that stores the data representative of the audio event.

16. A method of annotating an object with an audio event comprising the steps of:
recording an audio event with a hand-held device;
applying a data code onto the object with the hand-held device;
reading the data code from the object; and
playing back the audio event upon having read the data code from the object.

17. The method of claims 16 wherein the steps of recording, applying, reading, and playing back are performed using a hand-held, battery-operated device.

18. The method of claim 16 further comprising the steps of:
encrypting the recording of the audio event prior to applying the data code; and
decrypting the audio event prior to playing back the audio event.

19. The method of claim 16 wherein the step of applying a data code further comprises:
applying said data code onto a supplementary surface, and then applying the supplementary surface onto the object.

20. The method of claim 16 wherein the step of applying a data code further comprises:
applying a magnetically-readable strip onto the object.

21. A method of operating a device to play back an audio annotation comprising:
using a scanning component in the device to scan a code applied to a document;
finding an audio message that had been recorded and associated with the code; and
playing back the audio message with the device.

22. The method of claim 21 wherein the audio message was recorded with the device.

23. The method of claim 21 wherein the audio message was stored in the device.

* * * * *